Aug. 4, 1959 H. J. HANSEN 2,898,130
SAFETY SEAL
Filed Jan. 20, 1958

INVENTOR.
HOWARD J. HANSEN
BY Hudson, Boughton,
Williams, David & Hoffmann
ATTORNEYS United States Patent Office 2,898,130
Patented Aug. 4, 1959

2,898,130

SAFETY SEAL

Howard J. Hansen, Bay Village, Ohio, assignor to The Hansen Manufacturing Company, Cuyahoga County, Ohio, a corporation of Ohio Application January 20, 1958, Serial No. 710,037

2 Claims. (Cl. 285—96)

This invention relates to improvements in safety seals, that is to say safety seals for couplings of conductors of acrid fluids, either liquid or gaseous. It becomes necessary in some cases to provide conductors for such acrid fluids, for example propane and butane gases supplied in liquid form in pressurized containers.

When two parts of a coupling for such containers are pushed together the coupling does not always lock in the fully assembled position, in which event it may come apart and there may be some leakage. When leakage occurs in such a coupling some of the acrid fluid unavoidably strikes the hands of the operator, with the result that his hands are painfully burned.

One of the objects of the present invention is the provision of a coupling for conductors of acrid fluids, wherein the coupling is so constituted as to preclude leakage with consequent harm to the hands of the workman or operator.

Another object is the provision of a coupling having two sealing and locking positions, one of which becomes effective to seal off the coupling before the automatic valves in the coupling are opened to permit the acrid fluid to flow through the line. After the seal has become effective in the partially closed coupling, without opening the internal valves and thus starting the flow of acrid fluid, then the two coupling parts may be pushed together completely to open up flow through the line without disturbing the already formed seal.

Figure 1:
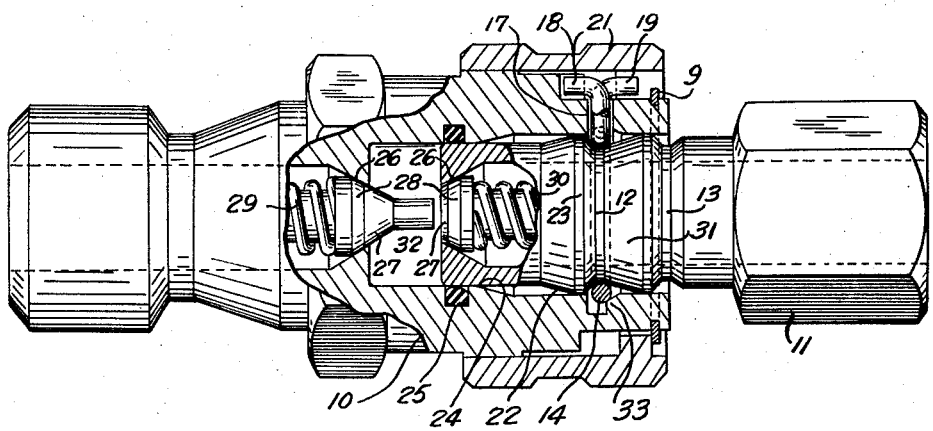
Figure 2:
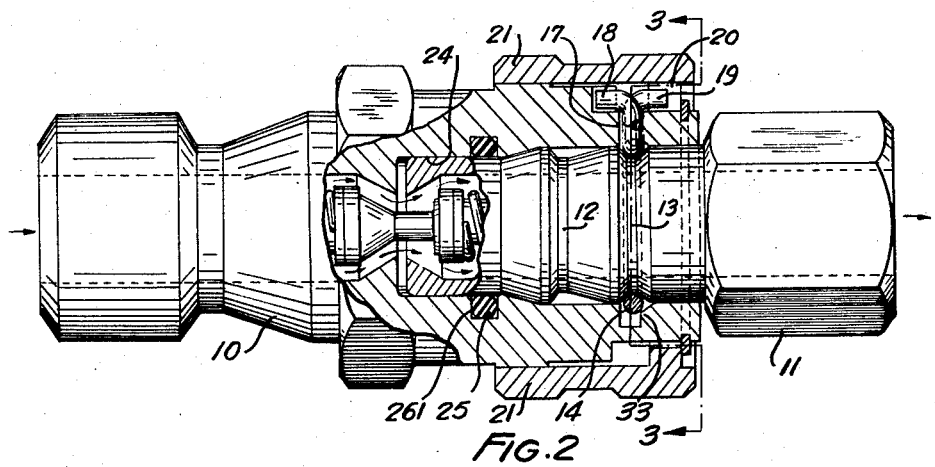
Figure 3:
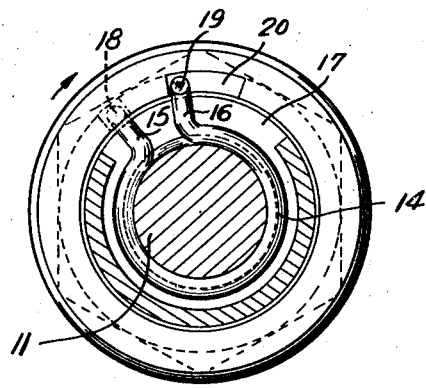

Other objects and features of novelty will appear as I proceed with the description of that embodiment of the invention which, for the purposes of the present application, I have illustrated in the accompanying drawing, in which Fig. 1 is a side elevation, partly in longitudinal central section, of my coupling, partially assembled, that is with the two parts of the coupling assembled to the extent that the split ring of the ring lock is registered with the forward groove, sealing the parts of the coupling together, but with the automatic internal valves closed and no fluid flowing, Fig. 2 is a similar view but with the parts of the coupling pushed together completely and the split ring of the ring lock engaging the rearmost groove in the plug of the two position coupling and the line open, and Fig. 3 is a across section taken substantially on the line 3—3 of Fig. 2.

The coupling of the present invention has a ring lock like the lock of my prior Patent 2,805,089, except that in the present case the ring lock is effected when either of two axially spaced grooves in the plug is brought into register with the split ring.

In the prior art couplings, when the plug is pushed in a trifle further than is necessary to crack the internal valves and open the line through the conductor, some pressurized fluid is likely to escape and get on to the hands of the operator. In the present construction, however, if the operator pushes the coupling parts together slightly further than is necessary to cause the ring lock to move into the forward groove, but not into the rear groove, the internal valve or valves may be cracked and a small quantity of acrid fluid received into the coupling, but the coupling will still be sealed and no fluid will escape. If no fluid then flows through the line as may be apparent from flow indicators, the operator will sense that something is wrong and he will push the coupling parts fully together until the split ring of the ring lock engages the rear groove, whereupon the line will be opened and fluid will flow.

In any event, no acrid fluid will get on to the hands of the operator during the assembly of the coupling parts.

In the drawing the coupling only is illustrated as comprising a socket member 10 and a plug member 11. Flexible or other conductors, not herein shown, are connected with these coupling members in order to provide a path of flow for fluid through the line. Such fluid may be any ordinary fluid commonly handled in coupled conductors, but in the present instance the fluid to be handled may be an acrid fluid from which the hands of the operator must be protected.

In Fig. 1 of the drawing the coupling is partially assembled. In this position it may be said to be presealed, that is to say the coupling is sealed before the internal valves are opened and the flow of acrid fluid through the line is begun. Fig. 3 illustrates the completely assembled position of the coupling parts, wherein the sealing of the parts is continued and the flow of fluid through the line has begun.

The plug member 11 is provided with two axially separated annular grooves 12 and 13. A ring lock comprising a split ring 14 of spring steel, preferably circular in cross section, is mounted in the socket member 10, this split ring being similar to the ring 27 of my aforesaid Patent 2,805,089. The ring consists partly of two radial portions 15 and 16 projected through a slot 17 in the socket member. The ends 18 and 19 of these radial portions are bent at right angles to the principal plane of the ring and extend in opposite directions parallel to the axis of the coupling. End 18 is anchored in a short pocket in the socket member 10, while end 19 projects into a somewhat extended annular pocket 20 formed on the inner side of sleeve 21. Sleeve 21 is mounted for limited rotation upon the socket member 10. Dislocation of the sleeve is prevented by a snap ring 9.

When plug 11 is pushed part way into the socket member 10, as in Fig. 1, split ring 14 is cammed outwardly, end 19 moving circularly within pocket 20, this camming action being effected by the tapered portion 22 of the plug. The split ring 14 is thus caused to move over the land 23 of the plug into the groove 12 thereof.

The nose 24 at the forward end of the plug is of constant diameter. When the split ring 14 enters the groove 12 of the plug the nose of the plug will have moved into sealing relation within a rubber O-ring 25 disposed in an internal groove 261 in the socket member 10, thereby sealing the joint between the two coupling members.

At least one, and preferably each of the coupling members, is provided with a tapered valve seat 26, these seats being closed in the unassembled condition of the coupling by tapered valve pieces 27 carrying gaskets 28 bearing against the valve seats. Coil springs 29 and 30 bias the valve pieces 27 toward the closed position indicated in Fig. 1. In the partially closed position of the coupling illustrated in Fig. 1, the valve pieces 27 are not in contact with each other and no fluid is permitted to flow through the line. The forward groove 12 of the plug has a rear inclined wall 31. If the operator in pushing the coupling together causes the split ring 14 to travel up that incline far enough, he may bring the adjacent ends of the two valve pieces 27 together, when the fluid in the line will enter the space 32 in the coupling. That space, however, will be sealed by the O-ring and no fluid will escape and get onto the hands of the operator.

With the coupling parts in the position of Fig. 1 and the split ring in register with the forward groove 12, the ring will lie partially in that groove and partially in the groove 33 of the socket member 10, thereby locking the coupling in this partially closed position. There will be no chance that the coupling will be unintentionally disconnected in this partially closed but sealed condition. Hence no pressurized fluid in the space 32 will escape accidentally.

Ordinarily the operator in the first instance will push the coupling parts completely together so as to cause the valve pieces 27 to engage each other and start flow through the line. However, in case he fails to start flow through the line because of failure to make the coupling completely, he will then push the parts completely together as illustrated in Fig. 2, causing the split ring 14 to enter the rear groove 13 of the plug, the O-ring 25 rolling along upon the nose 24 of the plug and maintaining the seal. As soon as the rear groove 13 comes into register with the ring 14 the latter will expand and enter partially the groove 33 of the socket member, and the parts will be firmly locked together.

What is claimed is:

1. A coupling for conductors of acrid fluids particularly, comprising a socket member and a plug member, a ring lock for said coupling comprising a split ring mounted in said socket member, said ring projecting normally inward into the path of the plug member as the latter is pushed forward into said socket member for making the coupling, said plug member having two annular grooves spaced apart axially, each of said annular grooves being adapted to be brought into register with said split ring, said plug member comprising a nose portion of constant diameter in advance of said grooves, said socket member having an internal annular groove, a rubber gasket mounted in said last-named groove in sealing relation with said nose portion when said split ring is in register with either one of said plug grooves or moving between these positions.

2. A coupling for conductors of acrid fluids particularly, comprising a socket member and a plug member, a locking element for said coupling mounted in said socket member, said element projecting normally into the path of the plug member as the latter is pushed forward into said socket member for making the coupling, said plug member having two annular grooves spaced apart axially, the plug member forward of each of said grooves having a gradually tapered camming surface capable of dislodging the locking element from the groove as the plug member is pushed inwardly, but whereby the plug member may not be withdrawn when said locking element is in engagement with either of said grooves until after said locking element is manually disabled, whereby said plug member may be pushed into the socket member until said locking element enters one of said annular grooves, but whereby the plug member may not be withdrawn when said locking element is in engagement with either of said grooves until after said locking element is manually disabled.

References Cited in the file of this patent

UNITED STATES PATENTS

| | | |
|---|---|---|
| 2,428,638 | Scheiwer | Oct. 7, 1947 |
| 2,665,928 | Omon et al. | Jan. 12, 1954 |
| 2,744,770 | Davidson et al. | May 8, 1956 |
| 2,797,110 | Covington | June 25, 1957 |
| 2,805,089 | Hansen | Sept. 3, 1957 |